Dec. 22, 1959   G. R. P. GUILLOT   2,918,343
RECORDER AND DISPLAY SYSTEM
Filed Dec. 5, 1956
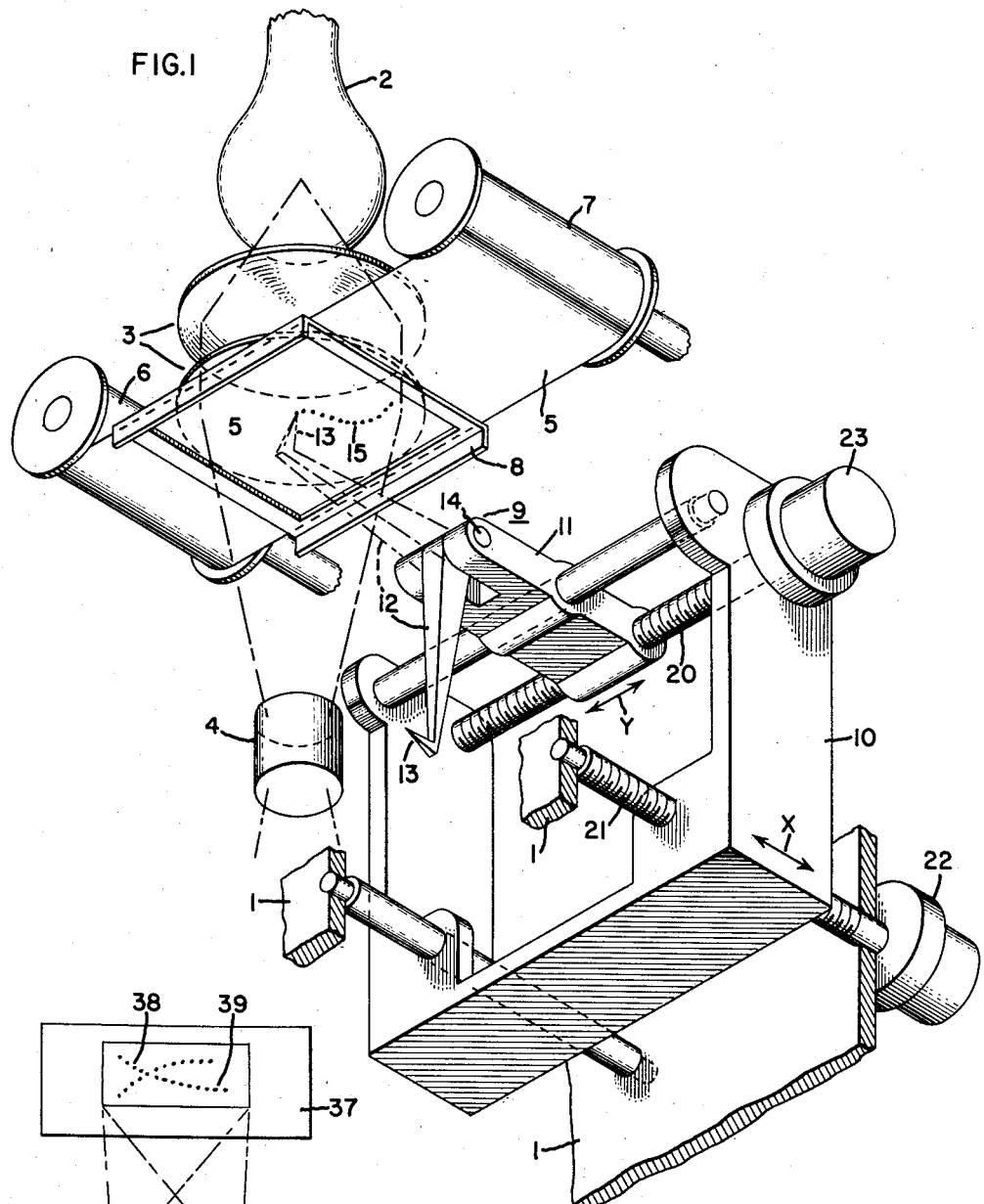
INVENTOR:
GEORGES RENÉ PIERRE GUILLOT,
BY 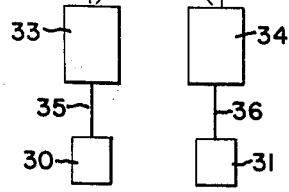
HIS ATTORNEY.

United States Patent Office 2,918,343
Patented Dec. 22, 1959

2,918,343

RECORDER AND DISPLAY SYSTEM

Georges Rene Pierre Guillot, Vitry-sur-Seine, France, assignor to Compagnie Française Thomson-Houston, Paris, France Application December 5, 1956, Serial No. 626,410

Claims priority, application France January 31, 1956

1 Claim. (Cl. 346—8)

This invention relates to the art of recording, and more particularly to the art of recording signals in form convenient for display.

In recent years, accent has been placed on recorder systems because of the increase in speed of information gathering. In the art of aircraft traffic control, for example, radar sets capable of accurately determining the present location of moving aircraft have been developed. However, for many applications, it has been desirable to record the changing position to present the history of the aircraft's positions as well as its present position. Although moving pen recorders have been developed, it has been desirable to record this information in such form that tracing of several aircraft paths is conveniently made. Further, it has been desirable to display the recorded information in sizes difficult to realize by moving pen recorders.

It is, therefore, one object of my invention to provide recording means easily utilized for multi-trace recording.

It is a further object of my invention to provide improved recording means for large scale displays.

It is a further object of my invention to provide improved method and means for recording information.

Accordingly I have provided in one embodiment of my invention an optical projector having an opaque mask obscuring light transmission. A perforating device is moved in accordance with the information to be recorded and punches holes in the mask. The complete history of the trace, such as aircraft position, is then projected by the projector to any convenient plotting surface.

In another embodiment, a plurality of recorders are arranged to project the trace on a single screen, to provide multitrace recording.

The features of my invention, which I believe to be novel, are set forth with particularity in the appended claim. My invention, itself, however, both as to its organization and method of operation, together with other objects and advantages, may best be understood by reference to the following description taken in connection with the accompanying drawings, in which:

Figure 1 is a perspective view of a recorder in accordance with my invention, and Figure 2 is a plan view of a multitrace recording system in accordance with my invention.

In Figure 1 there is shown a recorder in accordance with my invention containing, in a case 1, a conventional optical projection system comprising a light source 2, a condenser lens 3 and a projector lens 4. The projection system is fixed with respect to an outside projection screen not shown in the drawing for particular lens arrangements.

A thin, opaque mask 5 is mounted in the focal plane of the lens 4, a frame 8 exposing the illuminated part of this mask and forcing the mask to remain flat. The mask prevents light from reaching the screen.

The mask 5 consists, for example, of paper or a very thin metal sheet, metallized paper, or a similar material. This surface 5 may be in the form of a very long band of constant width, wound on a roll 6, from which it is wound to the roll 7.

Mechanisms, known to the art manually operated or automatic (not shown in the drawing), make it possible to advance this band when desired to replace the used part of the band with a clean portion in front of the frame 8.

The perforating system 9, designed to make small holes in the opaque mask 5, consists of an arm 12 pivoted about an axis 14 and provided, at its free end, with a puncturing pin 13.

The axis 14 of the arm 12 is supported by a carriage 11, operated by a fine screw 20 in either direction of the arrow y. This screw 20 is itself supported by a carriage 10, operated by a screw 21 in either direction of the arrow x, the distances x and y being, for example, perpendicular to each other.

The motion of the arm 12 about the axis 14 is controlled by any suitable means such as solenoid. When a hole has thus been punctured, the arm 12 returns to its initial position so as to no longer obstruct the projection field.

The information to be recorded, as for example, the successive positions of aircraft, is fed in the form of electrical quantities, e.g. voltage, to the servo-mechanisms, 22 and and 23. The servo-mechanisms, in a manner well known to the art, cause proportional displacement of carriage 10 and 11 in directions labeled x and y respectively. When the carriages reach the desired position, arm 12 is swung to punch a hole in the mask. It will be apparent to those skilled in the art that operation of arm 12 can be made by a solenoid triggered manually or automatically when the proper position is reached. In some systems the triggering pulse may be supplied after the position information by the source of information.

The transmission of information to the recorder is dictated by such factors as the reproduction scale desired. For example, in long range aircraft position plotting by radar, information might be supplied every 10 seconds. Then the succession of holes 15 thus made, indicates the present and past positions of the aircraft as a trajectory projected on a scaled plotting board or a properly sized map.

It is sometimes desirable to plot trajectories of several aircraft followed by different radar sets, as for example, in guidance of a missile on an intercept course. In such cases, the embodiment shown in Figure 2 is desirable.

In Figure 2 is shown two sources of information to be recorded, 30 and 31. These sources might be two radar sets, for example. The information from the sources is fed to two recorders 33 and 34 over lines 35 and 36 respectively. Each recorder is the same as shown in Figure 1. They are so adjusted as to project the recorded information on a common screen 37. In this manner the recorded trajectory 38 and 39 of recorders 33 and 34 respectively are projected and can cross without in the least disturbing the recorders.

It will be apparent to those skilled in the art that the use of the recorders in arrangements similar to those shown in Figure 2 has application to other fields than aircraft position plotting. The ability of the traces to overlap without complicated controls for the recorder is desirable.

While particular embodiments of the present invention have been shown and described, it will be obvious to those skilled in the art that changes and modifications may be made without departing from the invention in its broader aspects, and, therefore, the aim in the appended claim is to cover all such changes and modifications that fall within the true spirit and scope of the invention.

What I claim as new and desire to secure by Letters Patent of the United States is:

Apparatus for simultaneously recording and displaying the position and path of a moving object comprising a projection system including a light source, a condenser lens and a projection lens, an opaque recording element mounted in the focal plane of the projection lens, puncturing means, means for periodically actuating said puncturing means to perforate said recording element, means for obtaining two signals indicative of the position of an object in a coordinate plane, and means for moving said puncturing means along coordinate axes in a plane parallel to said recording element to perforate said recording element in accordance with the position of the object, said means for moving comprising a first carriage operable along one axis in response to one of the signals and a second carriage carrying said puncturing means movably mounted on said first carriage and operable along the coordinate axis in response to the other of the signals.

References Cited in the file of this patent

UNITED STATES PATENTS

| | | |
|---|---|---|
| 2,351,319 | Chase et al. | June 13, 1944 |
| 2,475,314 | Dehmel | July 5, 1949 |
| 2,651,521 | Wales | Sept. 8, 1953 |
| 2,686,099 | Bomberger et al. | Aug. 10, 1954 |
| 2,714,047 | Dehmel | July 26, 1955 |